(12) United States Patent
Watakabe et al.

(10) Patent No.: US 6,434,591 B1
(45) Date of Patent: Aug. 13, 2002

(54) THREAD CONTROL SYSTEM AND METHOD IN A COMPUTER SYSTEM

(75) Inventors: Takeshi Watakabe; Yoshiaki Hasegawa, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/334,949

(22) Filed: Jun. 17, 1999

(30) Foreign Application Priority Data

Jun. 19, 1998 (JP) .......................................... 10-172832

(51) Int. Cl.$^7$ ................................................ G06F 9/00
(52) U.S. Cl. ...................................... 709/103; 709/107
(58) Field of Search .............................. 709/103, 107; 714/47, 55, 2; 712/244

(56) References Cited

U.S. PATENT DOCUMENTS 5,513,319 A * 4/1996 Finch et al. ................... 714/55
5,845,117 A * 12/1998 Fujita .......................... 709/107
6,085,215 A * 7/2000 Ramakrishnan et al. ..... 709/102
6,085,218 A * 7/2000 Carmon ....................... 709/107
6,182,238 B1 * 1/2001 Cooper .......................... 714/2

* cited by examiner

Primary Examiner—Larry D. Donaghue
(74) Attorney, Agent, or Firm—Finnegan, Henderson, Farabow, Garrett & Dunner, L.L.P.

(57) ABSTRACT

The executing threads in CPU 100~103 are checked at random intervals in a specified range by interrupt execution modules 109~112, the results of the checks are stored in executing thread memory areas 113~116 and values of counters 117–120 that are corresponding to the executing threads are incremented. If the values of the counters 117~120 exceed specified values, applicable threads are judged to be operating abnormally and priorities of the applicable threads are lowered so as to prevent the abnormal operations of the threads.

9 Claims, 6 Drawing Sheets

OPERATING EXAMPLE OF THREAD WORKING AT HIGH PRIORITY

OPERATING EXAMPLE OF THREAD WORKING AT HIGH PRIORITY

EXAMPLE OF SOFTWARE AND HARDWARE CONFIGURATION

THREAD CONTROL SYSTEM AND METHOD IN A COMPUTER SYSTEM

BACKGROUND OF THE INVENTION

The present invention relates to a thread control system and a method for an operating system used in a computer system and more particularly to a system and a method for monitoring and controlling threads having such a high priority as to impede the execution of the operating system.

In the event where an operating system of a computer system runs into any abnormal operation, the computer system is recovered by an additional hardware such as a watchdog timer and a recovery processing program that is triggered to operate by the time over of a watchdog timer. On the other hand, if an application program runs into trouble of an endless loop during its execution, a CPU may be unreasonably occupied by the program. This kind of trouble is not detectable by a watchdog timer because the interruption process of an operation system is properly executed.

So far, in a computer system, except for the interruption process requiring a high priority, an operating system (hereinafter, referred to as OS) is impeded when a program is in trouble, if too high priority to impede OS is given to the program. For this reason, the computer system might possibly be disabled to operate.

To solve this problem, insufficient measures shown below were so far taken.

(1) No excessively high priority is given.
(2) While being well aware of the risk, high priorities are given.

However, when it was desired to make a response time short, it was not achieved to make a response time short by the above-mentioned measure (1). Further, with the above-mentioned measure (2), the operations of systems including other application software (hereinafter, referred to as application) could not be continued, if the systems should be in trouble. Therefore, the risk was high.

In particular, if a thread having a fixed priority is in such a trouble as the endless loop, the operation of other applications or threads required for systems can be impeded. However, when viewed from the OS, it does not regard the operation as abnormal by judging that the operation is properly executed because no error is detected. It has been, therefore, a general practice to use a fixed priority on the user's responsibility.

BRIEF SUMMARY OF THE INVENTION

The present invention has been made in order to solve the existing problems described.

It is an object to provide a thread control unit in a computer system for supervising of threads and for controlling a priority which enables to give the thread such high priorities as to impede the execution of an OS.

According to the present invention, high priorities with which the operation of an OS can be impeded are given to threads for an application (A thread is a basic unit for the execution of an application. An application comprises more than one thread). The status of threads is supervised at a regular interval. Even if a thread for the application is in trouble and a CPU is occupied, thus impeding the operation of an OS, a computer system is protected by detecting a thread that is operating abnormally and lowering a priority of that thread temporarily. Thus, it becomes possible to protect a computer system and other applications when a CPU is occupied by the abnormal operation of threads.

Further, according to the present invention, even if a priority of a thread is lowered temporarily, the lowered priority is restored to the pre-set original priority with a judgment that the thread becomes normal again, when a CPU is allocated in the next time and is then abandoned voluntarily for waiting an event.

In order to achieve the above-mentioned object in a thread control of an operating system for a computer system having one or more CPUS, an interruption signal is generated by a timer that counts for a specified time period. Then the thread executed by said CPU is checked when said interruption signal is received. The thread that is confirmed to be executing by the check is stored in the executing thread memory. The thread checked now is judged whether it is the same thread as checked last time and stored in said executing thread memory. When they are the same thread, a value of a counter that counts the number of thread checks is incremented. When the value of the counter is in excess of a specified value, it is judged that an applicable thread is operating abnormally. Then, a priority of the abnormal thread is force to be lowered to a priority that does not affect said operating system. When a CPU is allocated, thereafter, to the thread with a low priority, the priority is restored to the original higher priority, if the thread returned to the normal state by the execution of other tasks.

According to the present invention, whether a thread is in the normal state or not is judged by whether the thread abandons a CPU voluntarily for waiting an event or not. In other words, with respect to a thread which was judged to be abnormal as it occupied a CPU and the priority of which was lowered, its priority is restored to the original one when the thread is waiting for an event.

According to the present invention, it is possible to avoid the abnormal state by temporarily lowering a priority of a thread that is occupying a CPU unreasonably.

Further, according to the present invention, user is able to terminate an abnormal thread. For instance, user is able to terminate a thread and process by lowering a priority of a thread against the abnormal operation caused by an unavoidable logical bug. Thus, it is possible to safely shut down a computer system.

DETAILED DESCRIPTION OF THE PREFERRED EMBODIMENTS

Preferred embodiments of the present invention will be described below with reference to the accompanying drawings.

(First Embodiment)

Figure 1:
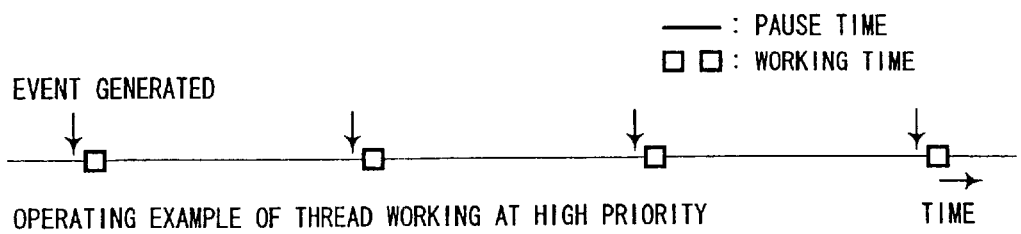
FIG. 1 is a conceptual diagram showing an example of the operation of threads in a computer system according to the present invention.
Figure 2:
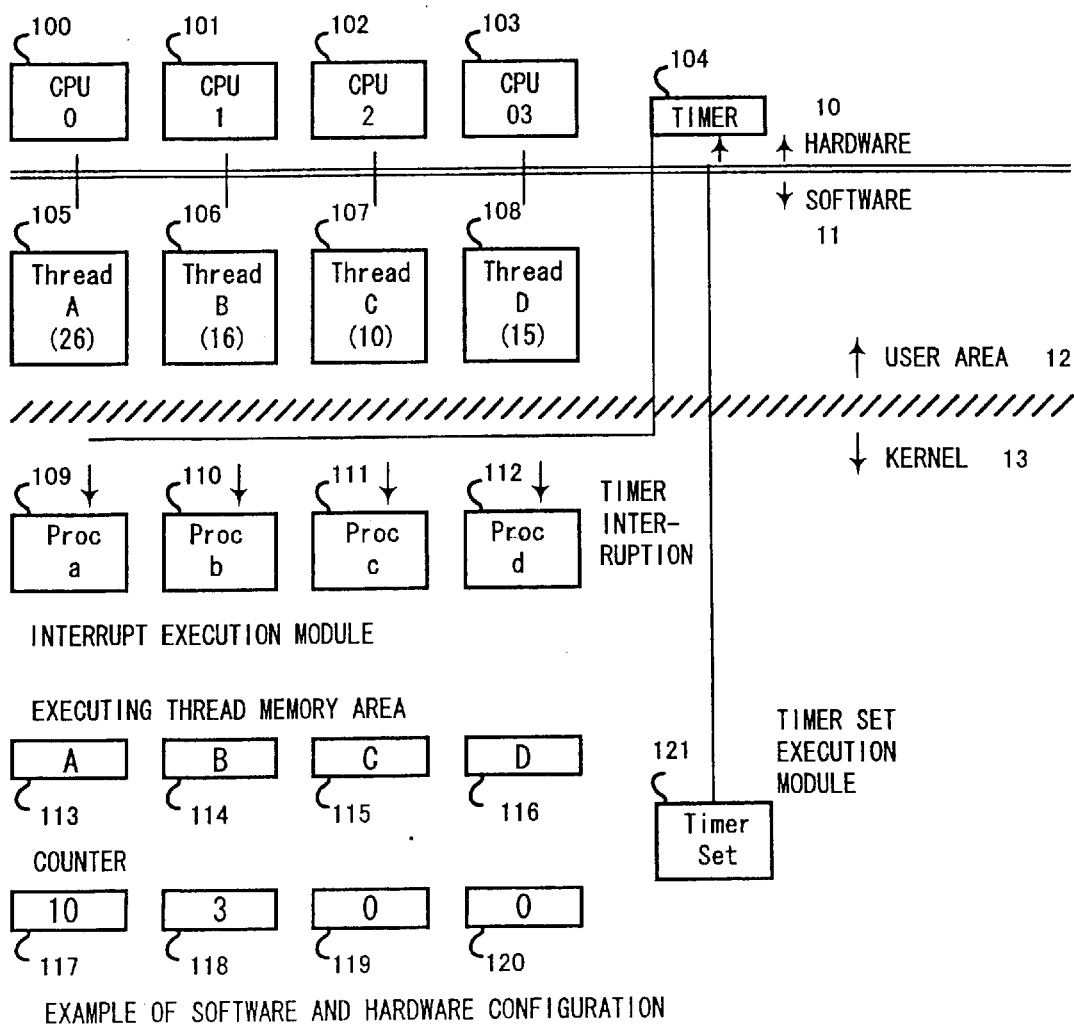
FIG. 2 is a block diagram showing a first embodiment of a thread control unit according to the present invention.

FIG. 1 is a conceptual diagram showing an example of a thread operation in a first embodiment of the present invention. FIG. 2 is a block diagram showing a computer system according to the first embodiment of the present invention. In the block diagram, structures not related to the present invention are omitted.

With reference to FIG. 1, square blocks indicate actual operating times of threads triggered by generation of some events. Further, a space between an actual operating time and next actual operating time indicates a pause time of a thread.

Each thread operates in a short time that does not affect a system when triggered by the generation of some events. During the remaining pause time, each thread is in the state waiting for events. Therefore, when a thread is operating for an unnecessarily long time, it should be judged that this thread is operating abnormally.

Events mean an input from an input device when an application is in operation. For instance, such interventions from the outside as a click input by a mouse, a key input through a keyboard, and a notice of event that is sent from other threads. At the time when an event is generated, a thread corresponding to that event is executed.

The computer system shown in FIG. 2 is equipped with four CPUs: CPU 0(100), CPU 1(101), CPU 2(102) and CPU 3(103), and a timer 104 as component elements of hardware 10. In the computer system according to the embodiment, CPU 0~3((100~103) are mounted; however, the present invention is not limited to the number of CPUs mounted. A specified time period is set on the timer 104 by a time set module 121 of a kernel 13. When the specified time period lapses, the timer 104 provides the interruption signal to interruption modules 109, 110, 111 and 112 that are corresponding to CPU 0~3(100~103) of the kernel 13.

Software 11 that is installed in the computer system comprises a user area 12 that is used by user and a kernel 13 that is a core portion of an OS. The kernel 13 has a part to execute such basic controls as the memory management and interruption control, inter-process communication, etc.

For simplicity of the explanation, an application that is used by user is assumed to be composed of Thread A (105), Thread B (106), Thread C (107) and Thread D (108). Here, threads A~D are assumed to correspond to CPUs 0~3 (100~104), respectively.

A numeral shown for each of threads A–D (105~108) represents a priority that is given to each thread at a certain moment. For instance, it is assumed that "26" is a priority for Thread A (105). Similarly, "16","10" and "15" are those for Thread B (106), Thread C (107) and Thread D (108) respectively.

The area of the kernel 13 of the present invention includes interruption modules a (109), b (110), c (111) and d (112). The area also includes execution thread memory areas A (113), B (114), C (115) and D (116) to store threads that are being executed in respective CPUs. The area further includes counters 117~120 that are areas for counting how much threads are executed continuously and a timer set module 121.

The timer set module 121 decides a time period and sets it on the timer 104. The time period decided by the timer set module 121 varies at random in a certain range every time it decides. When the timer 104 notifies the interruption modules a~d (109~112) of the time-lapse of the specified time, the interruption modules a~d (109~112) check or inspect the threads being executed in the corresponding CPUs 0~3 (100~103).

With the interruptions from the interruption modules a~d (109~112), the CPUs 0~3 (100~103) secure the execution environment of executing threads (i.e. securing of CPU registers, securing of address area information, etc.) and execute the interruption process according to the present invention. During the interruption process, the CPU 0~3 (100~103) store the results of the checking or inspection in the execution thread memory areas A~D (113~116), respectively. If threads stored in the executing thread memory areas A~D (113~116) as a result of the status checking or inspection conducted last time and the thread now being executed are the same, CPUs 0~3 (100~103) increment a value of the counter (one of 117~120) corresponding to the executing thread. Further, if the executing thread differs from that in the status checking or inspection of last time, a value of a counter (one of 117~120) is initialized. If threads are not abnormal, values of the counters 117~120 are initialized at a specified timing.

Here, the interruption execution modules a~d (109~112) correspond to CPU 0~3 (100~103), respectively and the results of checking or inspection of the executing threads for CPU 0~3 (100~103) are stored in the corresponding executing thread memory areas 113~116. Further, the counters 117~120 are also corresponding to the CPUs 0~3 (100~103), respectively and values of the counters 117~120 are changed according to the results of the checking or inspection.

For instance, the interruption execution module 109 corresponds to the CPU 0 (105). The interruption execution module 109 that is started up by the timer 104 checks or inspects an executing thread for the CPU 0(100). The result of this checking or inspection is stored in the executing thread memory area 113. If a thread stored in the executing thread memory area 113 differs from the thread that was checked or inspected last time, a value of the counter 117 is initialized. On the other hand, if those threads are identical, a value of the counter 117 is incremented, for instance, by (+1). In the example shown in FIG. 2, the value of the counter 117 indicates the number of checking or inspection of the thread A (105).

However, if the priority of the executing thread is as low as the priority by which the system is not affected, a counter is not required to increment its value even when the same thread is continuously checked or inspected. For instance, suppose the priorities of the threads C (107) and D (108) are "10" and "15" respectively, and the system is not affected by these values. Counters 119 and 120 are not required to increment their values even when the thread status checking or inspection continuously checks or inspects the same thread.

If values of the corresponding counters 117~120 exceed a certain predetermined value, the CPUs 0~3 (100~103) judge that a thread of extremely high priority operated for a long time. At this time, the number of thread checking indicating a long hour operation is counted by the interruption execution modules a~d (109~112), and the thread executing state, thus counted is stored in the corresponding interruption execution modules.

Further, the executing thread information for the CPUs 0~3 (100~103) that is checked or inspected by the interruption execution modules (109~112) as described above are stored in the executing thread memory areas 113~116.

Figure 3:
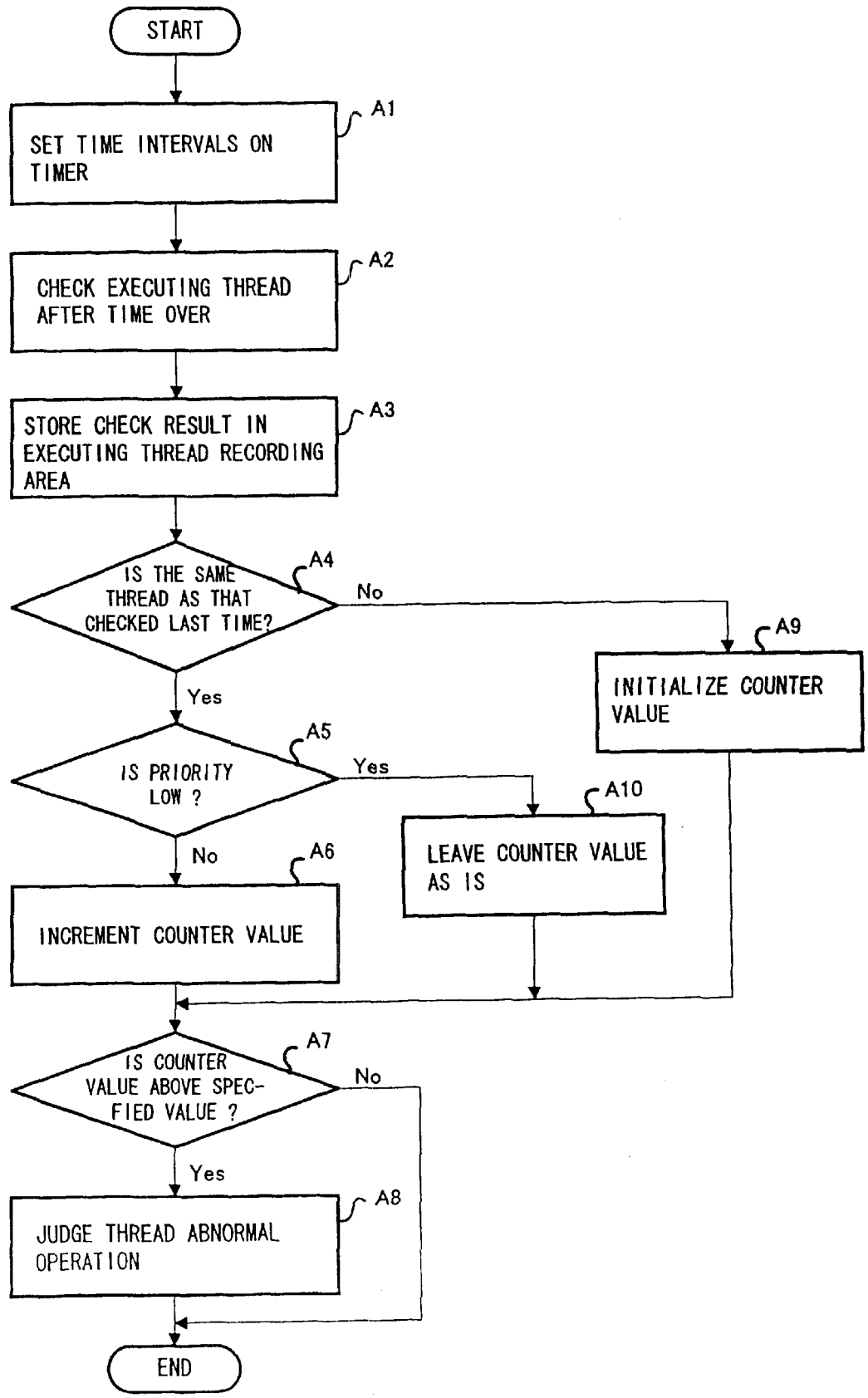
FIG. 3 is a flow chart showing an operation of the first embodiment of the invention shown in FIG. 2.

In the next, referring to the flow chart shown in FIG. 3, the operation of the thread supervisory or monitoring process according to the present invention will be described.

The timer set module 121 of the kernel 13 decides a time interval or a certain time period and set it in the timer 104 of the hardware 10 (STEP A1). This time interval or time period varies every time at random in a certain range. The timer 104 counts a time and notifies of the timer interruption to the interruption execution modules a~d (109~112) in the kernel 13 when the time interval or the certain time period lapses. The interruption execution modules a~d (109~112) thus notified by the timer 104 instruct the corresponding CPUs 0~3 (100~104) to check or inspect the executing threads (STEP A2).

Then, the information on the executing threads that are provided by the CPUs 0~3 (100~104) are stored in the corresponding executing thread memory areas A~D (113~116) (STEP A3). At the same time, the CPUs 0~3 (100~104) judge whether the executing threads are the same threads as those stored in the executing thread memory areas A~D (113~116) which were checked or inspected last time (STEP A4).

When the executing threads are the same threads as those stored in the executing thread memory areas A~D (113~116) which were checked or inspected last time (STEP A is Yes), the CPUs 0~3 (100~103) further judge whether the priority of the executing thread is as low as the priority which is not affecting the system (STEP A5). If the priority of the executing thread is as low as the priority which is not affecting the system, values of the corresponding counters 117~120 are left unchanged (STEP A10). However, if the executing thread has a too high priority to impede the system operation, a value of corresponding counter 117~120 is incremented (STEP A6). On the other hand, when the executing threads are different from the threads that were checked and stored in the executing thread memory areas A~D (113~116)last time (STEP A4 is No), values of the corresponding counters 117~120 (STEP A9) are initialized. In other words, it does mean that threads are properly operating.

Then, the CPUs 0~3 (100~103) judge whether values of the counters 117~120 are in excess of the predetermined values (STEP A7). When values of the counters 117~120 are not above the predetermined values (STEP A7 is No), the CPUs 0~3 terminate the processing.

However, when values of the counters 117~120 are in excess of the predetermined values (STEP A7 is Yes), the executing threads are judged to be abnormally operating (STEP A8).

(Second Embodiment)

A second embodiment of the present invention will be described with reference to FIG. 4 and FIG. 5.

In the second embodiment, when it is judged that a thread having an extremely high priority operates for a long time, the priority of that thread is controlled.

Figure 4:
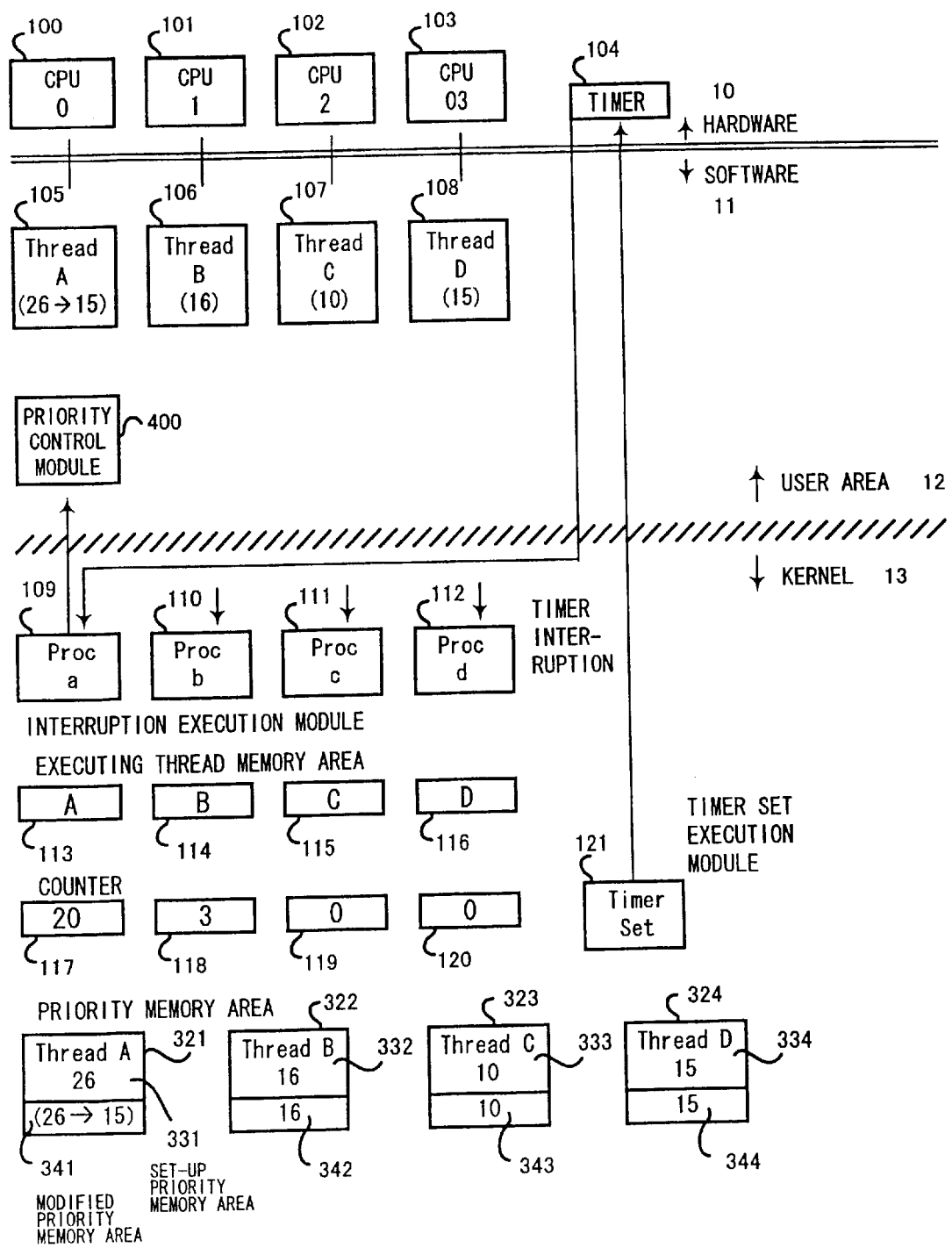
FIG. 4 is a block diagram showing a second embodiment of a thread control unit according to the present invention.

In a computer system shown in FIG. 4, a priority control module 400 is added in the user area 12 of the software 11 and priority memory areas 321~324 are added to the kernel 13 of the computer system shown in FIG. 2 respectively. Other configurations are the same as those shown in FIG. 2 and therefore, the same reference numerals are assigned to the corresponding components so that the duplicated explanations will be omitted.

The priority memory areas 321~324 are composed of set-up priority memory areas 331~334 and modified priority memory areas 341~344. In the set-up priority memory areas 331~334, priorities that are pre-set for respective threads are stored. Further, in the modified priority memory areas 341~344, priorities that are modified by the priority control module 400 are stored. These set-up priority memory area 331 and modified priority memory area 341 are corresponding to the thread A (105). Similarly, the set-up priority memory area 332 and the modified priority memory area 342 are to the thread B (106), the set-up priority memory area 333 and the modified priority memory area 343 are to the thread C (107), and the set-up priority memory area 334 and the modified priority memory area 344 are to the thread D (108), respectively.

Figure 5:
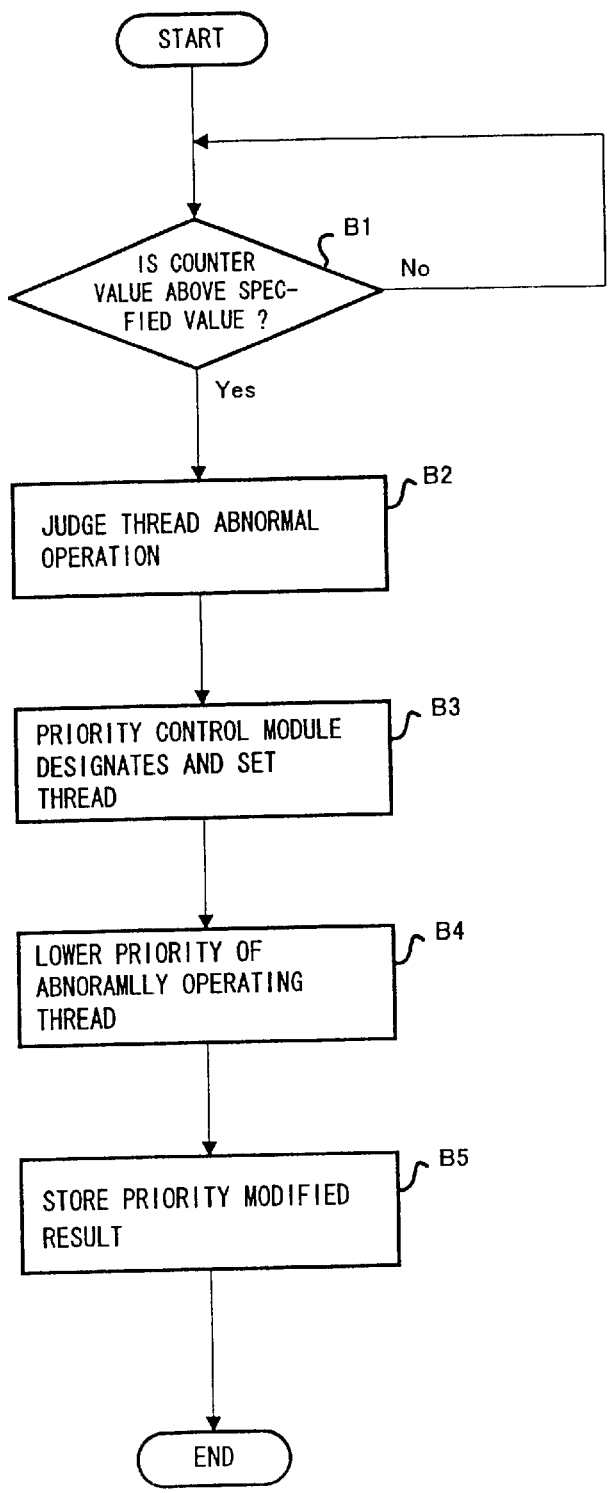
FIG. 5 is a flow chart showing an operation of the second embodiment of the present invention shown in FIG. 4.

FIG. 5 is a flow chart showing an operation for the thread priority control in the second embodiment of the present invention.

The thread control operation will be explained based on the following assumption. Prior to the execution of the thread priority control, the interruption process shown in FIG. 3 was executed and the values of the counters 117~120 were modified corresponding to the executing threads for the CPUs 0~3(100~103).

The CPUs 0~3(100~103) judge whether the values of the counters 117~120 are in excess of the predetermined values after checking the status of the executing threads (STEP B1). When the values of the counters 117~120 are not in excess of the predetermined values (STEP B1 is No), the process returns to the initial step. On the other hand, when the values of the counters 117~120 are in excess of the predetermined values (STEP B1 is Yes), the thread is judged as operating abnormally (STEP B2). For instance, assuming that the thread A (105) operates abnormally and occupied the CPU 0(100), a value of the counter 117, that is a number of thread checking times, for the CPU 0(100) exceeds a predetermined value.

In the next, the interruption execution module a (109) for the thread A (105) sets the priority control process of the abnormal thread A (105) in the priority control module 400 in order to lower the priority of the thread A (105) (STEP B3).

The current priority "26" of the abnormal thread A (105) is stored in the set-up priority memory area 331 of the priority memory area 321. The priority control module forces to lower the current priority "26" of the abnormal thread A (105) to a lower priority that does not affect an OS (for instance, "15") (STEP B4). Then, the priority control module stores the value of modified priority "15" in the modified priority memory area 341 (STEP B5). Thus, the priority of the abnormal thread A (105) is now set at "15" by the process.

After the priority modification process, it is possible to allocate the thread E (not shown) having a higher priority than the thread A (105) to the CPU 0 (100) for the execution under the control of an OS. As a result, the thread A (105) has now abandoned the CPU 0(100).

(Third Embodiment)

A third embodiment of the present invention will be described with reference to FIG. 6 and FIG. 7.

In the third embodiment, thread having a modified priority is able to restore its priority to an original one for the reason of waiting an event, for instance.

Figure 6:
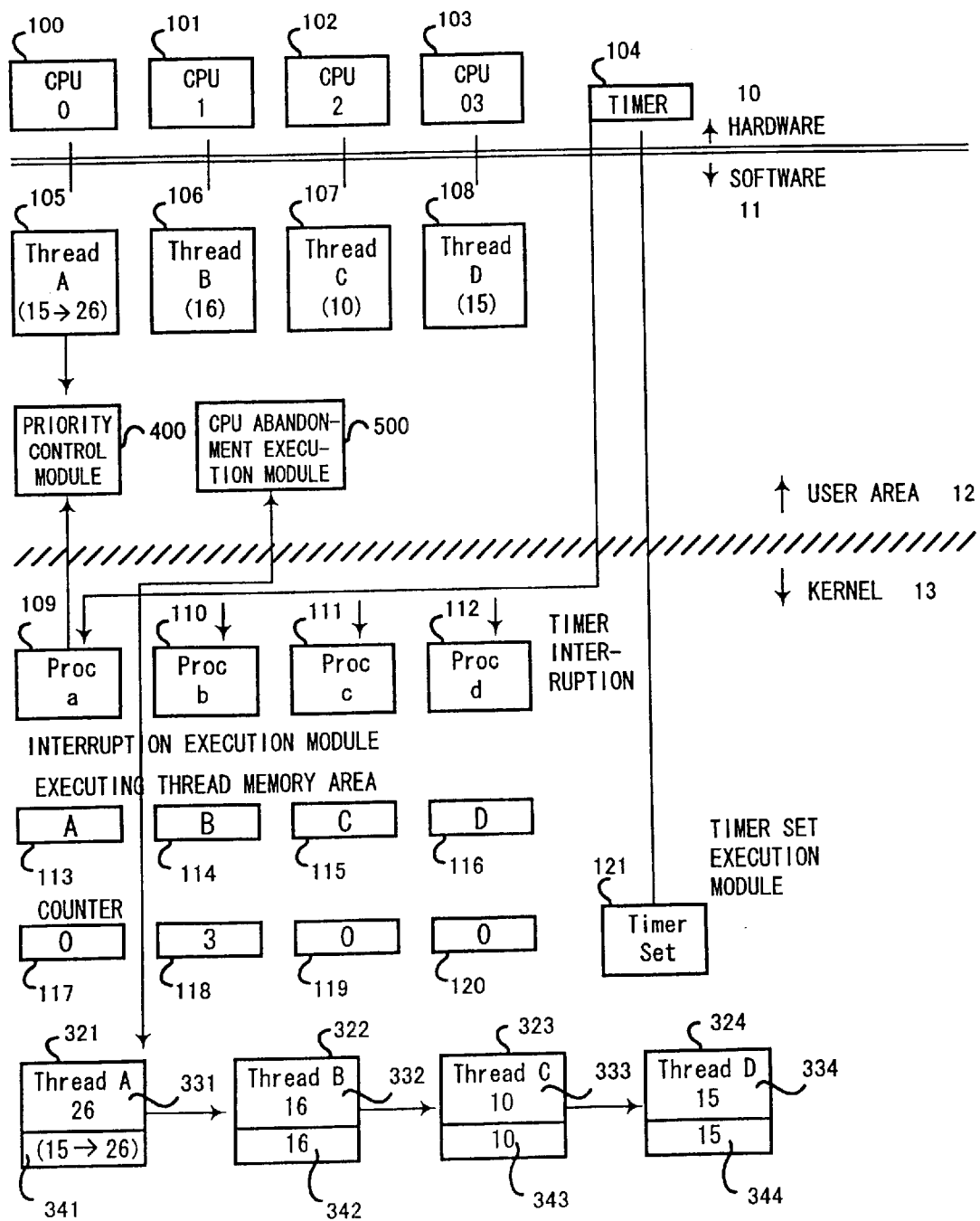
FIG. 6 is a block diagram showing a third embodiment of the thread control unit according to the present invention.

In a computer system shown in FIG. 6, a CPU abandonment module 500 for abandoning the CPU is added in the user area of the software 11 of the computer system shown in FIG. 4. Other configurations are the same as those shown in FIG. 4 and therefore, the same reference numerals are assigned to the corresponding elements so that the duplicate explanations thereof may be omitted.

Figure 7:
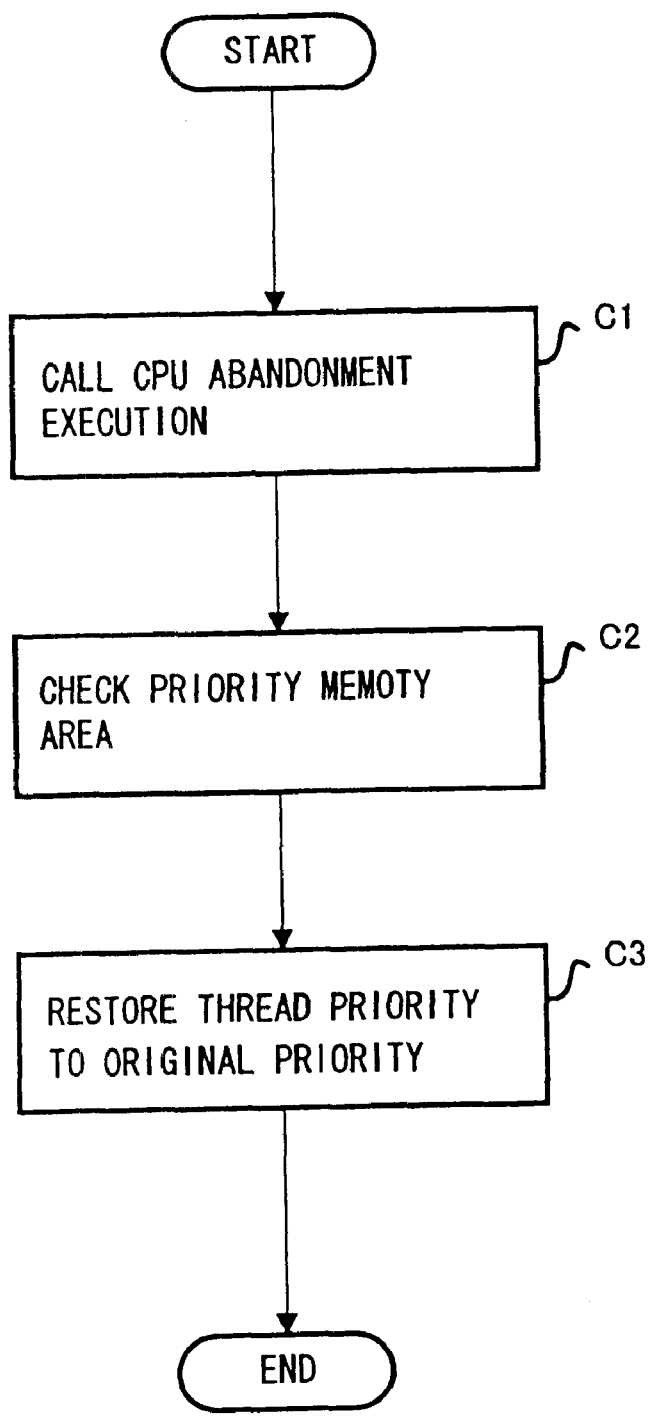
FIG. 7 is a flow chart showing an operation of the third embodiment of the present invention shown in FIG. 6.

FIG. 7 is a flow chart showing the operation for restoring a modified priority to the original one.

For instance, when the thread A is judged to be abnormal, the thread A itself starts up the priority control module 400 in order to abandon the CPU 0(100). The priority of the thread A (105) is then modified from "26" to "15", for instance, by the priority control module 400. As a result, CPU 0(100) executing the thread A (105) is able to execute another thread that has a higher priority than the thread A (105).

Prior to executing the abandonment process, the priority control module 400 controls the CPU abandonment module 500 so that it is executed when the thread A abandons a CPU upon its own initiative for the reason of waiting an event, etc. If the thread A (105) is in the normal state when a CPU is again allocated to it, the CPU abandonment module 500 is called since the thread A (105) intends to abandon the CPU for waiting an event (STEP C1).

The CPU abandonment module 500, thus, checks the priority memory area 321 of the thread A (105). The CPU abandonment module 500 compares the priority "26", stored in the set-up priority memory area 331 of the priority memory area 321 with the priority "15" stored in the modified priority memory area 341 and recognizes that the originally set up priority "26", was changed to "15" (STEP C2).

Then, the CPU abandonment module 500 actuates the priority control module 400 to restore the priority "15" of the thread A (105) to the original priority "26" that is stored in the set-up priority memory area 331 and stores it in the modified priority memory area 341 (STEP C3). Thereafter, the thread A (105) is able to continue the process with the pre-set original priority.

According to the present invention as described above, it is possible to supervise or monitor the occupation of a CPU by a thread for its abnormal operation. It is also possible to set a priority of an abnormal thread at a lower priority by force if a CPU is occupied by a thread for its abnormal operation.

As a result, it is possible to avoid the operation of a system and other applications from being impeded by a thread that has an extremely high priority. In particular, the present invention has an excellent effect on a thread having a fixed priority. In other words, if an endless loop trouble took place when a thread having a fixed priority is used, an OS is not able to cope with it. According to the preset invention, however, the priority of an abnormal thread can be changed to a lower priority.

Further, if an abnormal thread is returned to the normal state, the modified priority can be restored to the original priority with which the thread is possible to execute the process.

What is claimed is:

1. A thread control system for an operating system used in a computer system having one or more CPU(s), comprising:
    an interruption signal generating means for generating an interruption signal by a timer that counts a predetermined time;
    an interruption execution means for checking a thread that is being executed in one of said CPU(s) upon receipt of said interruption signal from said interruption generating means;
    an executing thread memory means for storing the executing thread of said CPU that are checked by said interruption execution means; and
    a counter means for judging whether the thread stored in said executing thread memory means which was checked last time and the executing thread are identical or not and for incrementing a value of said counter means if they are identical, and
    a means for judging that said thread is abnormally operating if said value of said counter means is in excess of a predetermined value.

2. A thread control system according to claim 1, wherein said counter means initialize said value when the thread stored in said executing thread memory means which was checked last time and the executing thread are not identical.

3. A thread control unit according to claim 1, wherein said counter means does not increment said value if the priority of the thread is so low that the operating system is not affected, even when the thread stored in said executing thread memory means which was checked last time and the executing thread are identical.

4. A thread control unit according to claim 1, wherein said thread has a fixed priority.

5. A thread control method in an operating system for a computer system having one or more CPUs comprising the steps of:
    generating interruption signals by a timer that counts a specified period of time;
    checking threads being executed by said CPUs upon receipt of said interruption signals;
    storing the threads being executed by said CPUs in thread memory means;
    judging whether the threads checked last time and stored in said thread memory means which was checked last time and the executing thread are identical or not and for incrementing a value of said counter means if they are identical, and
    judging that the thread is abnormally operating if said value of said counter means is in excess of a predetermined value.

6. A thread control method according to claim 5, wherein said counter means initialize said value when the thread stored in said executing thread memory means which was checked last time and the executing thread are not identical.

7. A thread control method according to claim 5, wherein said counter means does not increment said value if the priority of the thread is so low that the operating system is not affected, even when the thread stored in said executing thread memory means which was checked last time and the executing thread are identical.

8. A thread control method in an operating system for a computer system having one or more CPUs comprising the steps of:
    generating interruption signals by a timer that counts a specified period of time;
    checking threads that are being executed by said CPUs upon receipt of said interruption signals;
    storing said threads that are being executed by the CPUs in thread memory means;
    judging whether the threads checked last time and stored in said thread memory means which was checked last time and the executing thread are identical or not and for incrementing a value of said counter means if they are identical, and
    judging that the thread is abnormally operating if said value of said counter means is in excess of a predetermined value.

9. A thread control method according to claim 8, wherein said CPUs are able to use threads that have priorities higher than said modified priorities.

* * * * *